(12) United States Patent
Schwarze et al.

(10) Patent No.: US 10,413,997 B2
(45) Date of Patent: Sep. 17, 2019

(54) LEVELING SLIDER EXCHANGE ARRANGEMENT FOR USE IN AN APPARATUS FOR MANUFACTURING THREE-DIMENSIONAL WORK PIECES

(71) Applicant: SLM Solutions Group AG, Luebeck (DE)

(72) Inventors: Dieter Schwarze, Luebeck (DE); Toni Adam Krol, Luebeck (DE)

(73) Assignee: SLM Solutions Group AG, Luebeck (DE)

( * ) Notice: Subject to any disclaimer, the term of this patent is extended or adjusted under 35 U.S.C. 154(b) by 368 days.

(21) Appl. No.: 15/346,566

(22) Filed: Nov. 8, 2016

(65) Prior Publication Data

US 2017/0129049 A1    May 11, 2017

(30) Foreign Application Priority Data

Nov. 10, 2015  (EP) .................................... 15193831

(51) Int. Cl.
    *B23K 26/144*    (2014.01)
    *B33Y 30/00*     (2015.01)
    (Continued)

(52) U.S. Cl.
    CPC .......... *B23K 26/144* (2015.10); *B22F 3/1055* (2013.01); *B23K 15/0026* (2013.01);
    (Continued)

(58) Field of Classification Search
    CPC .. B23K 26/144; B23K 26/702; B23K 26/342; B23K 15/0026; B23K 15/0086;
    (Continued)

(56) References Cited

U.S. PATENT DOCUMENTS

2006/0219163 A1  10/2006  Merot et al.
2008/0156263 A1  7/2008  Montero-Escuder et al.
(Continued)

FOREIGN PATENT DOCUMENTS

EP    2202016 B1    4/2012
EP    2818305 A1    12/2014
(Continued)

OTHER PUBLICATIONS

European Search Report, EP15193831.2, SLM Solutions Group AG, dated Apr. 21, 2016, 5 pages.
(Continued)

*Primary Examiner* — Ibrahime A Abraham
*Assistant Examiner* — John J Norton
(74) *Attorney, Agent, or Firm* — Taft Stettinius & Hollister LLP

(57) ABSTRACT

A leveling slider exchange arrangement for use in an apparatus for manufacturing three-dimensional work pieces by irradiating powder layers with electromagnetic radiation or particle radiation, the leveling slider exchange arrangement comprises a powder application device adapted to apply a raw material powder onto a carrier and a leveling slider adapted to level the raw material powder applied onto the carrier by means of the powder application device. An attachment mechanism is adapted to releasably attach the leveling slider in a leveling slider attachment position in the powder application device. A storage chamber is adapted to store at least one exchange leveling slider, the storage chamber being connected to a connecting channel adapted to connect the storage chamber to the leveling slider attachment position in the powder application device. A leveling slider exchange mechanism is adapted to withdraw the exchange leveling slider from the storage chamber, to move the exchange leveling slider to the leveling slider attachment
(Continued)

Figure 1:
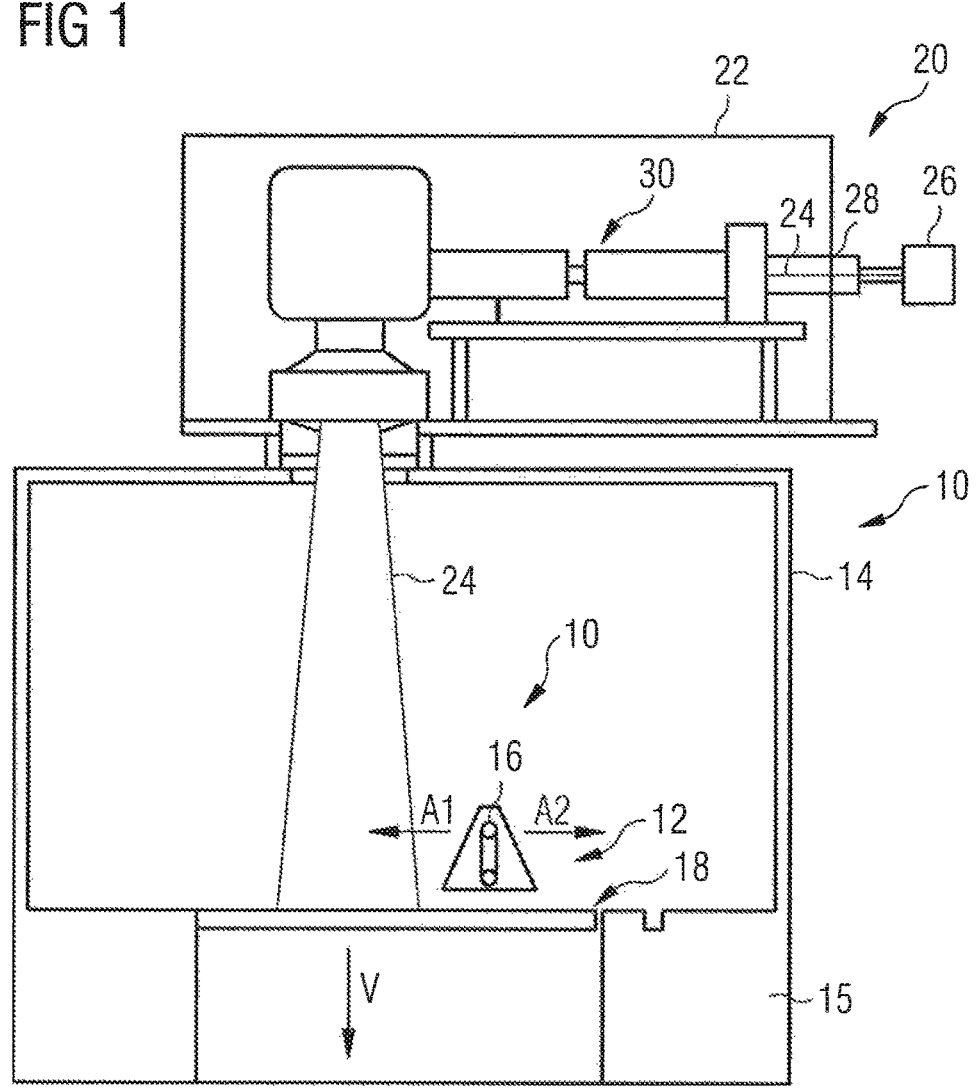

position in the powder application device via the connecting channel and to bring the exchange leveling slider into engagement with the attachment mechanism.

15 Claims, 4 Drawing Sheets

(51) Int. Cl.
| | |
|---|---|
| *B33Y 40/00* | (2015.01) |
| *B23K 26/342* | (2014.01) |
| *B23K 26/70* | (2014.01) |
| *B22F 3/105* | (2006.01) |
| *B23K 15/00* | (2006.01) |
| *B29C 64/153* | (2017.01) |
| *B29C 64/20* | (2017.01) |

(52) U.S. Cl.
CPC ........ *B23K 15/0086* (2013.01); *B23K 26/342* (2015.10); *B23K 26/702* (2015.10); *B29C 64/153* (2017.08); *B29C 64/20* (2017.08); *B33Y 30/00* (2014.12); *B33Y 40/00* (2014.12); *B22F 2003/1056* (2013.01); *Y02P 10/295* (2015.11)

(58) Field of Classification Search
CPC ....... B33Y 40/00; B33Y 30/00; B29C 64/153; B29C 64/20; B22F 3/1055
See application file for complete search history.

(56) References Cited

U.S. PATENT DOCUMENTS

2014/0175708 A1* 6/2014 Echigo .................. B22F 3/1055
264/460
2014/0377117 A1 12/2014 Herrmann et al.

FOREIGN PATENT DOCUMENTS

GB        2482010 A      1/2012
WO      2014191200 A1   12/2014

OTHER PUBLICATIONS

Translation of Japanese Examination Report, Application No. JP2016-217706, dated Dec. 21, 2017, 3 pages.

* cited by examiner

LEVELING SLIDER EXCHANGE ARRANGEMENT FOR USE IN AN APPARATUS FOR MANUFACTURING THREE-DIMENSIONAL WORK PIECES

The present invention relates to a leveling slider exchange arrangement for use in an apparatus for manufacturing three-dimensional work pieces by irradiating powder layers with electromagnetic radiation or particle radiation. Further, the present invention relates to a method of operating a leveling slider exchange arrangement of this kind. Finally, the present invention is directed to an apparatus for manufacturing three-dimensional work pieces by irradiating powder layers with electromagnetic radiation or particle radiation which is equipped with a leveling slider exchange arrangement of this kind.

Powder bed fusion is an additive layering process by which pulverulent, in particular metallic and/or ceramic raw materials can be processed to three-dimensional work pieces of complex shapes. To that end, a raw material powder layer is applied onto a carrier and subjected to laser radiation in a site selective manner in dependence on the desired geometry of the work piece that is to be produced. The laser radiation penetrating into the powder layer causes heating and consequently melting or sintering of the raw material powder particles. Further raw material powder layers are then applied successively to the layer on the carrier that has already been subjected to laser treatment, until the work piece has the desired shape and size. Powder bed fusion may be employed for the production of prototypes, tools, replacement parts, high value components or medical prostheses, such as, for example, dental or orthopaedic prostheses, on the basis of CAD data.

A powder application device which may be used for applying raw material powder layers onto a carrier of an apparatus for manufacturing work pieces by irradiating powder layers with electromagnetic radiation or particle radiation is described in EP 2 818 305 A1. This powder application device comprises a powder storage for storing raw material powder and a powder supply channel which is configured to discharge raw material powder from the powder storage onto the carrier. A channel opening/closing element is provided in the powder supply channel and configured to be moved between a first position and a second position. In its first position, the channel opening/closing element allows the discharge of raw material powder from the powder storage onto the carrier, whereas, in its second position, the first channel opening/closing element prevents the discharge of raw material powder from the powder storage onto the carrier. The first channel opening/closing element is moved between its first and its second position by means of an external mechanical force which is caused by abutting the channel opening/closing element against a stopper of the device for manufacturing work pieces when moving the powder application apparatus over the carrier.

Furthermore, as disclosed in EP 2 202 016 B1, a powder application device for use in an apparatus for manufacturing work pieces by irradiating powder layers with electromagnetic radiation or particle radiation may be equipped with a leveling slider which is positionable relative to a powder outlet opening of the powder application device by vertical displacement between an idle position and an operating position. In its idle position, the leveling slider is not in contact with a raw material powder layer applied onto a carrier. To the contrary, in its operating position, the leveling slider sweeps across a raw material powder layer and levels the raw material powder, when the powder application device is moved across the carrier. Alternatively, the leveling slider may be positionable relative to the powder outlet opening by horizontal displacement between a first position and a second position such that it is always positionable relative to the powder outlet opening in such a manner that it sweeps across a raw material powder layer applied onto the carrier in order to level the raw material powder layer during operation of the powder application device, when the powder application device is moved across the carrier in opposite directions.

It is an object of the present invention to provide a leveling slider exchange arrangement for use in an apparatus for manufacturing three-dimensional work pieces by irradiating powder layers with electromagnetic radiation or particle radiation which allows a particularly efficient operation of the apparatus and thus a particularly efficient production of three-dimensional work pieces. Further, it is an object of the present invention to provide a method of operating a leveling slider arrangement of this kind. Finally, it is an object of the present invention to provide an apparatus for manufacturing three-dimensional work pieces by irradiating powder layers with electromagnetic radiation or particle radiation which is equipped with a leveling slider exchange arrangement of this kind.

These objects are addressed by a leveling slider arrangement as defined in claim 1, a method of operating a leveling slider arrangement as defined in claim 9 and an apparatus for manufacturing three-dimensional work pieces as defined in claim 15.

A leveling slider exchange arrangement for use in an apparatus for manufacturing three-dimensional work pieces by irradiating powder layers with electromagnetic radiation or particle radiation comprises a powder application device adapted to apply a raw material powder onto a carrier of the apparatus for manufacturing three-dimensional work pieces. In principle, the carrier may be a rigidly fixed carrier. Preferably, however, the carrier is designed to be displaceable in a vertical direction so that, with increasing construction height of a work piece, as it is built up in layers from the raw material powder, the carrier can be moved downwards in the vertical direction. The raw material powder preferably is a metallic powder, in particular a metal alloy powder, but may also be a ceramic powder or a powder containing different materials. The powder may have any suitable particle size or particle size distribution. It is, however, preferable to process powders of particle sizes <100 µm. Preferably, the powder application device is movable relative to the carrier. Specifically, the powder application device may be movable back and forth across the carrier. The powder application device may be of any suitable design. For example, the powder application device may be designed as described in EP 2 818 305 A1.

The leveling slider exchange arrangement further comprises a leveling slider which is adapted to level the raw material powder applied onto the carrier by means of the powder application device. The leveling slider may, for example, comprise a leveling surface which is adapted to slide across the raw material powder applied onto the carrier by means of the powder application device. At least the leveling surface of the leveling slider may be made of an elastic material such as, for example a rubber material. Additionally or alternatively thereto, the leveling slider, in the region of its leveling surface, may be provided with at least one protrusion or lip. Preferably, two protrusions or lips having substantially the same shape are provided in the region of the leveling surface of the leveling slider. This design of the leveling surface ensures that, by guiding the leveling slider across the raw material powder applied onto the carrier, a smooth raw material powder surface is obtained.

An attachment mechanism of the leveling slider exchange arrangement is adapted to releasably attach the leveling slider in a leveling slider attachment position in the powder application device. The releasable attachment of the leveling slider to the powder application device allows an exchange of a used leveling slider, for example when the leveling and smoothening function of the leveling slider is impaired due to wear of the leveling surface of the leveling slider.

The leveling slider exchange arrangement further comprises a storage chamber which is adapted to store at least one exchange leveling slider. Basically, the storage chamber may be adapted to store only one exchange leveling slider. Preferably, however, the storage chamber is sized and dimensioned so as to be adapted to accommodate a plurality of exchange leveling sliders. The storage chamber is connected to a connecting channel which is adapted to connect the storage chamber to the leveling slider attachment position in the powder application device. Thus, the connecting channel allows an exchange leveling slider to be moved from the storage chamber to the leveling slider attachment position in the powder application device.

Finally, the leveling slider exchange arrangement comprises a leveling slider exchange mechanism which is adapted to withdraw the exchange leveling slider from the storage chamber, to move the exchange leveling slider to the leveling slider attachment position in the powder application device via the connecting channel and to bring the exchange leveling slider into engagement with the attachment mechanism. Basically, the leveling slider exchange arrangement may operate automatically and carry out the above defined actions, for example, in response to a sensor signal indicating that an exchange of the leveling slider is necessary or in response to a command that is manually input by an operator. It is, however, also conceivable that the leveling slider exchange arrangement is designed in such a manner that a manual input is necessary so as to initiate the withdrawal of the exchange leveling slider from the storage chamber, the movement of the exchange leveling slider to the leveling slider attachment position in the powder application device via the connecting channel and/or the engagement of the exchange leveling slider with the attachment mechanism. In the leveling slider exchange arrangement, the leveling slider exchange mechanism may only be put into operation after manually releasing a used leveling slider from its attachment position in the powder application device. It is, however, also conceivable that the release of a used leveling slider takes place in connection with the engagement of the exchange leveling slider with the attachment mechanism as will be described in more detail below.

The leveling slider exchange arrangement allows a quick and easy placement of the exchange leveling slider in the leveling slider attachment position in the powder application device. As a result, in an apparatus for manufacturing three-dimensional work pieces which is equipped with the leveling slider arrangement, the placement of the exchange leveling slider can be carried out during a continuing work piece generation process. Thus, an interruption of the work piece generation process due to a necessary exchange of the leveling slider can be avoided or at least kept very short. Hence, a particularly efficient operation of the apparatus and a particularly efficient production of three-dimensional work pieces can be achieved.

In a preferred embodiment, the leveling slider exchange mechanism is adapted to apply a suction force in order to withdraw the exchange leveling slider from the storage chamber, to move the exchange leveling slider to the leveling slider attachment position in the powder application device via the connecting channel and to bring the exchange leveling slider into engagement with the attachment mechanism. For example, the leveling slider exchange mechanism may be provided with a pump or another suitable low-pressure generation device such as a blower or the like for generating the suction force which is necessary for withdrawing the exchange leveling slider from the storage chamber, for moving the exchange leveling slider to the leveling slider attachment position and for bringing the exchange leveling slider into engagement with the attachment mechanism.

Alternatively or additionally thereto, the leveling slider exchange mechanism may be adapted to apply a pushing force to the exchange leveling slider in order to withdraw the exchange leveling slider from the storage chamber, to move the exchange leveling slider to the leveling slider attachment position in the powder application device via the connecting channel and to bring the exchange leveling slider into engagement with the attachment mechanism. For example, the leveling slider exchange mechanism may be provided with a manually or automatically operable pushing rod or another manually or automatically operable pushing means which is suitable to apply a pushing force to the exchange leveling slider in order to withdraw the exchange leveling slider from the storage chamber, to move the exchange leveling slider to the leveling slider attachment position and to bring the exchange leveling slider into engagement with the attachment mechanism.

Preferably, the suction force and/or pushing force applied to the exchange leveling slider is sufficient to disengage the leveling slider from the attachment mechanism upon bringing the exchange leveling slider into engagement with the attachment mechanism. This allows an additional step of disengaging the used leveling slider to be exchanged from the attachment mechanism to be dispensed with. The leveling slider exchange process then can be realized particularly easily and quickly.

Alternatively or additionally thereto, the leveling slider exchange mechanism may comprise a release mechanism which is adapted to release the leveling slider to be exchanged from its attachment position in the powder application device before bringing the exchange leveling slider into engagement with the attachment mechanism. The release mechanism may be adapted to apply a suction force to the leveling slider to be exchanged. For example, the release mechanism may comprise a pump or another low-pressure generating device which is suitable to generate the suction force that is necessary for releasing the leveling slider to be exchanged from its attachment position in the powder application device. Alternatively or additionally thereto, the release mechanism may be adapted to apply a pushing force to the leveling slider to be exchanged. For example, the release mechanism may comprise a manually or automatically operable pushing rod or another manually or automatically operable pushing means for generating the pushing force that is required for releasing the leveling slider to be exchanged from its attachment position in the powder application device.

In one embodiment of the leveling slider exchange arrangement, the storage chamber is arranged in the powder application device and the connecting channel extends through the powder application device from the storage chamber to the leveling slider attachment position. For example, the connecting channel may extend through the powder application device in a vertical direction, when the powder application device is arranged in its operating position relative to the carrier. The connecting channel then may connect a storage chamber which is arranged in an upper region of the powder application device, i.e. a region of the powder application device which faces away from the carrier, to a leveling slider attachment position which is arranged in a lower region of the powder application device close to the carrier in such a position that a leveling slider arranged in the leveling slider attachment position can slide across a raw material powder layer applied onto the carrier by means of the powder application device. An integration of the storage chamber into the powder application device allows the leveling slider exchange arrangement to be of a simple structure. However, the weight and the size of the powder application device is increased.

In an alternative embodiment of the leveling slider exchange arrangement, the storage chamber is arranged in a first housing part of the apparatus for manufacturing three-dimensional work pieces by irradiating powder layers with electromagnetic radiation or particle radiation. The powder application device then preferably is positionable relative to the first housing part of the apparatus in such a manner that the connecting channel which extends through the first housing part of the apparatus connects the storage chamber to the leveling slider attachment position in the powder application device. For example, the connecting channel may extend through the first housing part of the apparatus in a vertical direction from the storage chamber to an opening provided in a surface of the first housing part. The powder application device then may be positioned in such a manner that the leveling slider attachment position, which may be arranged in a lower region of the powder application device close to the carrier in such a position that a leveling slider arranged in the leveling slider attachment position can slide across a raw material powder layer applied onto the carrier by means of the powder application device, is placed above said opening. By integrating the storage chamber into the powder application device the size and the weight of the powder application device is not effected by the presence of the storage chamber, the connecting channel and the exchange leveling slider.

Finally, it is also conceivable to provide the leveling slider exchange arrangement with a first storage chamber that is arranged in the powder application device and a second storage chamber that is arranged in a first housing part of the apparatus for manufacturing three-dimensional work pieces. The first storage chamber may be kept relatively small. For example the first storage chamber may be sized so as to accommodate only one or two exchange leveling sliders so as to maintain the size and the weight of the powder application device small. The second storage chamber then may be of a bigger size and used to accommodate additional exchange leveling sliders.

The leveling slider exchange mechanism may further comprise a receiving chamber which is adapted to receive the leveling slider to be exchanged when the leveling slider is released from its attachment position in the powder application device. For example, the receiving chamber may be arranged in a second housing part of the apparatus for manufacturing three-dimensional work pieces by irradiating powder layers with electromagnetic radiation or particle radiation. In particular, the receiving chamber may be defined by a recess provided in a surface of the second housing part. The powder application device may be positionable relative to the second housing part of the apparatus in such a manner that the leveling slider is received in the receiving chamber upon being released from its attachment position in the powder application device. The provision of a receiving chamber simplifies the exchange of a used leveling slider, since the powder application device can simply be positioned relative to the second housing part in such a manner that the leveling slider attachment position is placed above the receiving chamber and the used leveling slider is received in the receiving chamber when it is released from its attachment position in the powder application device, either before or upon the exchange leveling slider is brought into engagement with the attachment mechanism.

The receiving chamber may be configured to accommodate more than one leveling slider. A biasing mechanism which may, for example, comprise a pushing rod, may be provided for biasing a leveling slider which is released from its attachment position in the powder application device into a storage position within the receiving chamber so that a further leveling slider may be accommodated in the receiving chamber. As a result, emptying of the receiving chamber is only required after several leveling slider exchanges.

The attachment mechanism of the leveling slider exchange arrangement may comprise at least one biasing element which is adapted to bias the leveling slider into its attachment position in the powder application device. The leveling slider then may be released from its attachment position in a simple manner by the application of a force, for example a suction force and/or a pushing force, which counteracts the biasing force applied to the leveling slider by the at least one biasing element.

The at least one biasing element may comprise a spring element which is adapted to apply a spring force to an abutting element. For example, the spring element may be accommodated in a recess provided in a sidewall of the connecting channel and may have a first end bearing against a base wall of said recess and a second end bearing against the abutting element. The abutting element may be adapted to abut against the leveling slider so as to bias the leveling slider into its attachment position in the powder application device. Preferably, the abutting element has a shape which is adapted to the shape of the leveling slider in order to ensure proper engagement of the abutting element with the leveling slider and thus proper attachment of the leveling slider in its leveling slider attachment position in the powder application device.

The abutting element, in the region of an abutting surface which contacts the leveling slider when the biasing element biases the leveling slider into its attachment position in the powder application device, may be provided with a recess adapted to interact with a corresponding protrusion provided on the leveling slider. This ensures a particularly secure engagement of the abutting element with the leveling slider and thus a particularly secure attachment of the leveling slider in its leveling slider attachment position in the powder application device.

In a preferred embodiment, the attachment mechanism comprises a first biasing element adapted to bias the leveling slider into a first biasing direction and a second biasing element adapted to bias the leveling slider into a second biasing direction opposite to the first biasing direction. The first and the second biasing element then are adapted to clamp the leveling slider therebetween. Such a design of the attachment mechanism allows both a secure attachment of the leveling slider in its leveling slider attachment position in the powder application device and a simple release of the leveling slider from its leveling slider attachment position in case a used leveling slider should be exchanged.

In a method for operating a leveling slider exchange arrangement for use in an apparatus for manufacturing three-dimensional work pieces by irradiating powder layers with electromagnetic radiation or particle radiation, a powder application device is provided which is adapted to apply a raw material powder onto a carrier. Further, a leveling slider is provided which is adapted to level the raw material powder applied onto the carrier by means of the powder application device. The leveling slider is attached in a leveling slider attachment position in the powder application device by means of an attachment mechanism. At least one exchange leveling slider is stored in a storage chamber, wherein the storage chamber is connected to a connecting channel adapted to connect the storage chamber to the leveling slider attachment position in the powder application device. The exchange leveling slider is withdrawn from the storage chamber, moved to the leveling slider attachment position in the powder application device via the connecting channel and brought into engagement with the attachment mechanism by means of a leveling slider exchange mechanism.

The leveling slider exchange mechanism may apply a suction force and/or a pushing force to the exchange leveling slider in order to withdraw the exchange leveling slider from the storage chamber, to move the exchange leveling slider to the leveling slider attachment position in the powder application device via the connecting channel and to bring the exchange leveling slider into engagement with the attachment mechanism. The suction force and/or pushing force applied to the exchange leveling slider may be sufficient to disengage the leveling slider to be exchanged from the attachment mechanism upon bringing the exchange leveling slider into engagement with the attachment mechanism.

The leveling slider to be exchanged may be released from its attachment position in the powder application device before bringing the exchange leveling slider into engagement with the attachment mechanism by means of a release mechanism. The release mechanism may apply a suction force and/or a pushing force to the leveling slider to be exchanged.

The storage chamber may be arranged in the powder application device and the connecting channel may extend through the powder application device from the storage chamber to the leveling slider attachment position. Alternatively or additionally thereto, the storage chamber may be arranged in a first housing part of the apparatus for manufacturing three-dimensional work pieces by irradiating powder layers with electromagnetic radiation or particle radiation. The powder application device then may be positioned relative to the first housing part of the apparatus in such a manner that the connecting channel which extends through the first housing part of the apparatus connects the storage chamber to the leveling slider attachment position in the powder application device.

The leveling slider may be received in a receiving chamber when the leveling slider to be exchanged is released from its attachment position in the powder application device. The receiving chamber may be arranged in a second housing part of the apparatus for manufacturing three-dimensional work pieces by irradiating powder layers with electromagnetic radiation or particle radiation. The powder application device then may be positioned relative to the second housing part of the apparatus in such a manner that the leveling slider to be exchanged is received in the receiving chamber upon being released from its attachment position in the powder application device.

Preferably, the leveling slider is biased into its attachment position by means of at least one biasing element. The at least one biasing element may comprise a spring element applying a spring force to an abutting element. The abutting element may abut against the leveling slider so as to bias the leveling slider into its attachment position in the powder application device.

The abutting element, in the region of an abutting surface, which contacts the leveling slider when the biasing element biases the leveling slider into its attachment position in the powder application device, may be provided with a recess. The recess may interact with a corresponding protrusion provided on the leveling slider.

The leveling slider may be biased into a first biasing direction by means of a first biasing element. Furthermore, the leveling slider may be biased into a second biasing direction opposite to the first biasing direction by means of second biasing element. The first and the second biasing element thus may clamp the leveling slider therebetween so as to fix the leveling slider in its attachment position in the powder application device.

An apparatus for manufacturing three-dimensional work pieces by irradiating powder layers with electromagnetic radiation or particle radiation comprises an above-described leveling slider exchange arrangement.

Figure 2:
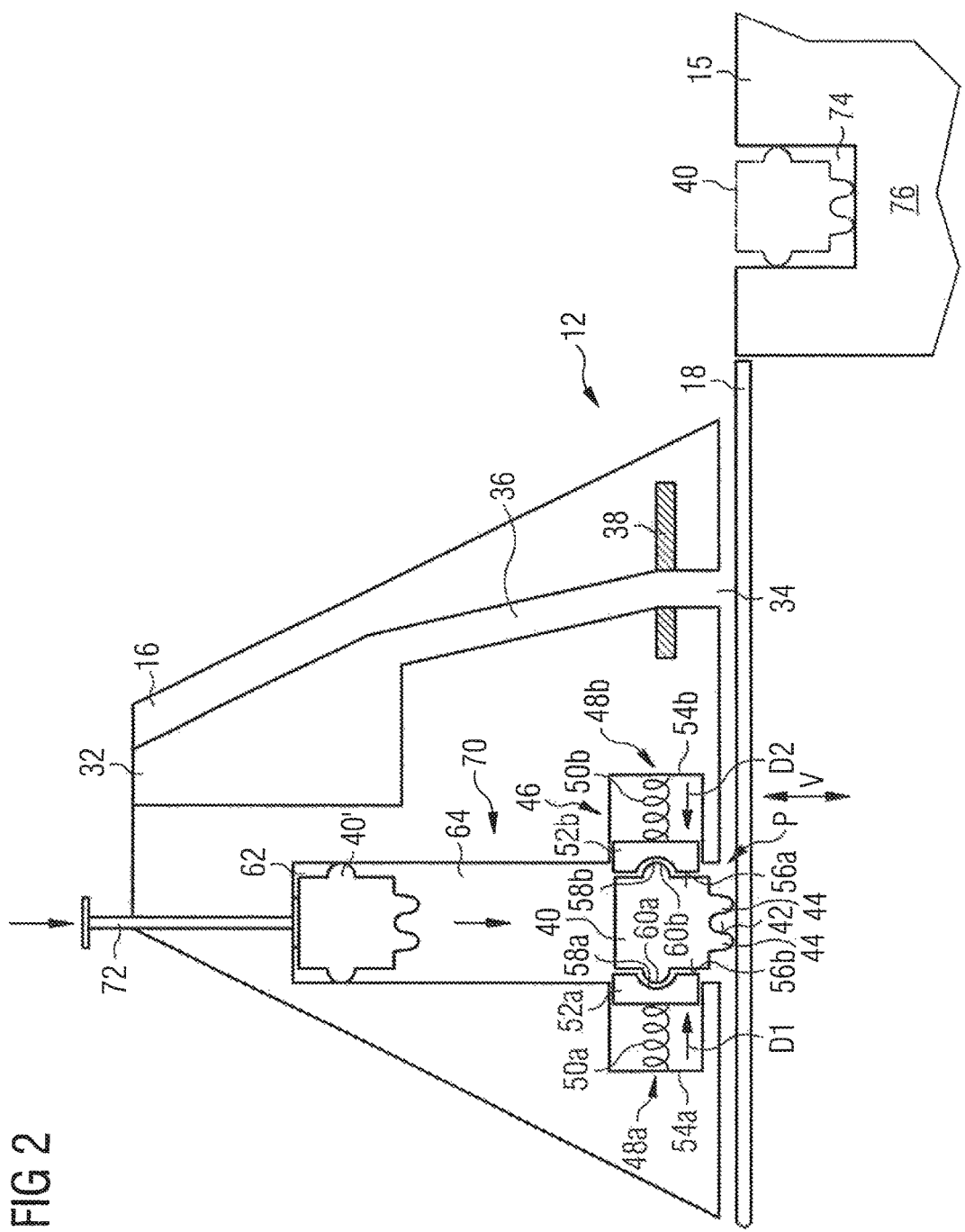
Figure 3:
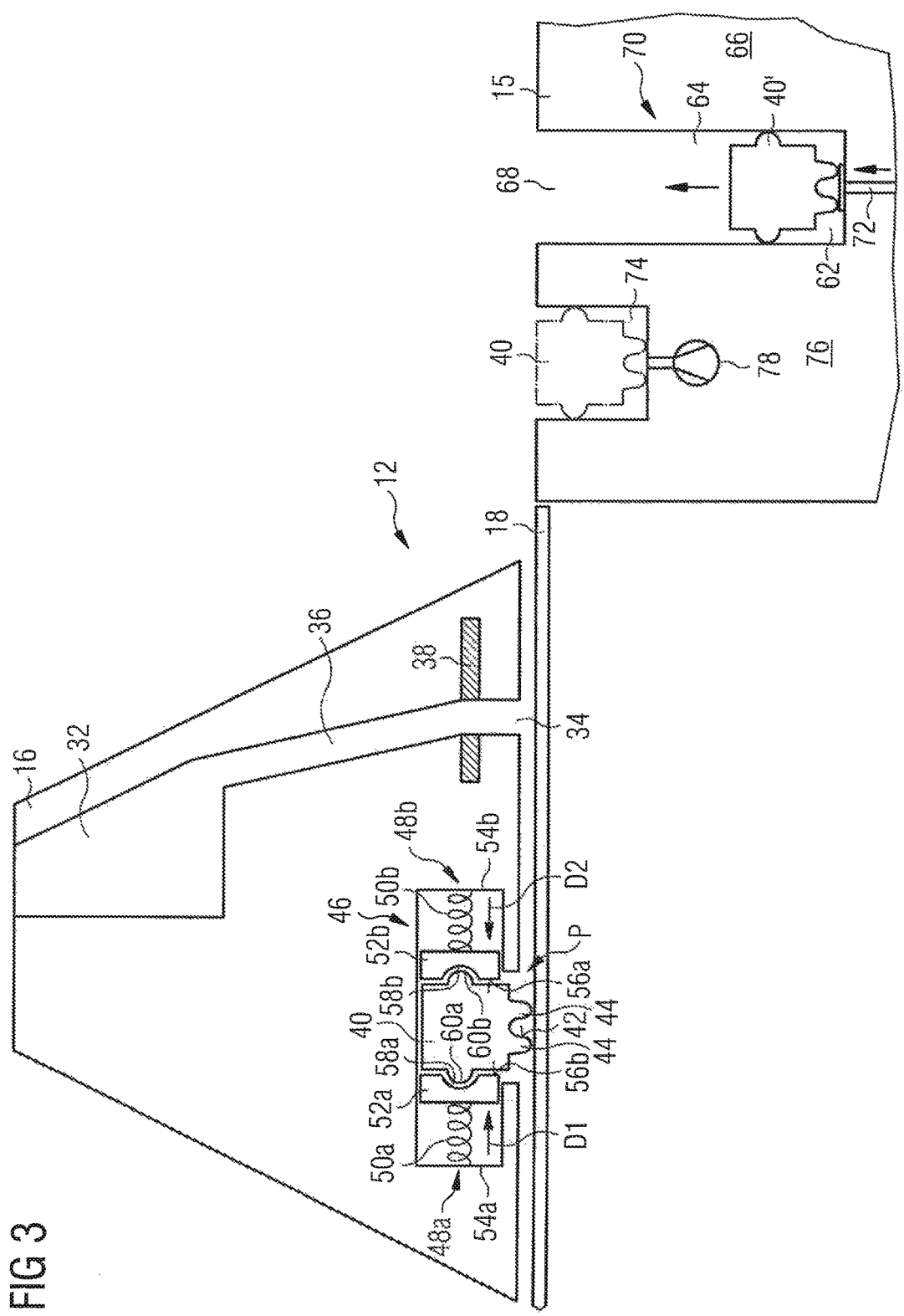
Figure 4:
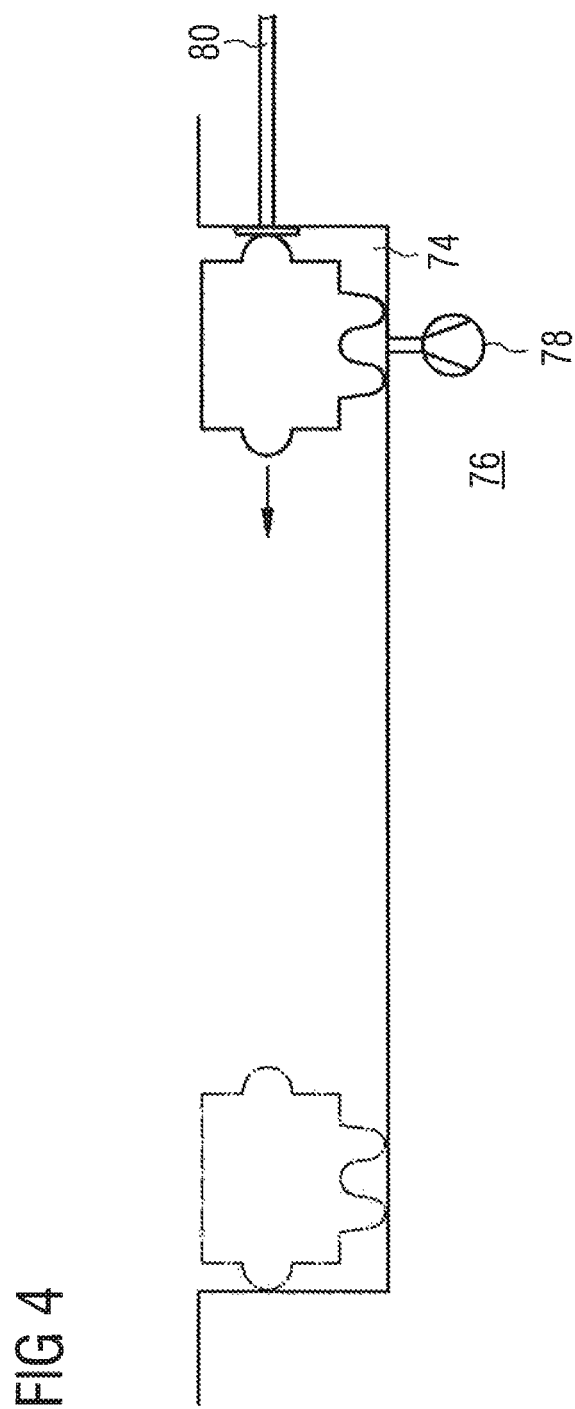

Preferred embodiments of the invention in the following are explained in greater detail with reference to the accompanying schematic drawing, in which:

FIG. 1 shows an apparatus for producing three-dimensional work pieces by irradiating layers of a raw material powder with electromagnetic or particle radiation, FIG. 2 shows a first embodiment of a leveling slider exchange arrangement which may be employed in the apparatus according to FIG. 1, FIG. 3 shows a second embodiment of a leveling slider exchange arrangement which may be employed in the apparatus according to FIG. 1 and FIG. 4 shows a sectional view of a receiving chamber of the leveling slider exchange arrangement according to FIG. 3.

FIG. 1 shows an apparatus 10 for manufacturing a component by an additive layer construction method which is equipped with a leveling slider exchange arrangement 12 shown in greater detail in FIGS. 2 and 3. The apparatus 10 comprises a process chamber 14 which is sealable against the ambient atmosphere, i.e. against the environment surrounding the process chamber 14, and which is integrated into a housing 15 of the apparatus 10. A powder application device 16, which serves to apply a raw material powder onto a carrier 18 of the apparatus 10, is accommodated within the process chamber 14. The powder application device 16 is movable back and forth across the carrier 18 as indicated by arrows A1, A2. The carrier 18 is designed to be displaceable in a vertical direction V so that, with increasing construction height of a component, as it is built up in layers from the raw material powder on the carrier 18, the carrier 18 can be moved downwards in the vertical direction V.

The apparatus 10 further comprises an irradiation device 20 for selectively irradiating laser radiation onto the raw material powder applied onto the carrier 18. By means of the irradiation device 20, the raw material powder applied onto the carrier 18 may be subjected to laser radiation in a site-selective manner in dependence on the desired geometry of the component that is to be produced. The irradiation device 20 has a hermetically sealable housing 22. A radiation beam 24, in particular a laser beam, provided by a radiation source 26, in particular a laser source which may, for example, comprise a diode pumped Ytterbium fibre laser emitting laser light at a waves length of approximately 1070 to 1080 nm is directed into the housing 22 via an opening 28.

The irradiation device 104 further comprises an optical unit 30 for guiding and processing the radiation beam 24. The optical unit 30 may comprise a beam expander for expanding the radiation beam 24, a scanner and an object lens. Alternatively, the optical unit 30 may comprise a beam expander including a focusing optic and a scanner unit. By means of the scanner unit, the position of the focus of the radiation beam 24 both in the direction of the beam path and in a plane perpendicular to the beam path can be changed and adapted. The scanner unit may be designed in the form of a galvanometer scanner and the object lens may be an f-theta object lens.

During operation of the apparatus 10, a first layer of a component to be produced is generated on the carrier 18 by selectively irradiating the raw material powder layer applied onto the carrier 18 with the radiation beam 24. The radiation beam 24 is directed over the raw material powder layer applied onto the carrier 18 in accordance with CAD data of the component to be produced. After the first layer of the component to be produced is completed, the carrier 18 is lowered in a vertical direction allowing the application of a successive powder layer by means of the powder application device 16. Thereafter, the successive powder layer is irradiated by means of the irradiation device 20. Thus, layer by layer, the component is built up on the carrier 18.

As becomes apparent from FIGS. 2 and 3, the powder application device 16 comprises a powder chamber 32 for receiving and storing raw material powder to be applied onto the carrier 18. The powder chamber 32 is connected to a powder outlet opening 34 via a powder supply channel 36. A closing/opening element 38 is arranged in the powder supply channel 32 which is movable between a closed position and an open position and serves to selectively close or open the powder supply channel 36. In the embodiment of FIGS. 2 and 3, the powder application device 16 comprises only one powder chamber 32 and only one powder outlet opening 34. It is, however, also conceivable to provide the powder application device 16 with two powder chambers and two powder outlet openings and in particular to design the powder application device 16 as described in EP 2 818 305 A1.

A leveling slider 40 is mounted to the powder application device 16 and serves to level the raw material powder applied onto the carrier 18 by means of the powder application device 16 via the powder outlet opening 34 so as to form a uniform raw material powder layer with a smooth raw material powder layer surface. If desired, the leveling slider 40 maybe designed as described in EP 2 202 016 B1, in order to avoid "blank runs" upon moving the powder application device 16 across the carrier 18.

The leveling slider 40 comprises a leveling surface 42 which slides across the raw material powder applied onto the carrier 18 by means of the powder application device 16 when the powder application device 16 is moved across the carrier 18. At least the leveling surface 42 of the leveling slider 40 is made of an elastic material such as, for example a rubber material. Furthermore, the leveling slider 40, in the region of its leveling surface 42, is provided with two protrusions or lips 44. This design of the leveling surface 42 ensures that, by guiding the leveling slider 40 across the raw material powder applied onto the carrier 18, a smooth raw material powder surface is obtained.

An attachment mechanism 46 serves to releasably attach the leveling slider 40 in a leveling slider attachment position P in the powder application device 16. The attachment mechanism 46 comprises at least one biasing element 48a, 48b which is adapted to bias the leveling slider 40 into its attachment position P in the powder application device 16. In particular, the attachment mechanism 46 comprises a first biasing element 48a adapted to bias the leveling slider 40 into a first biasing direction D1 and a second biasing element 48b adapted to bias the leveling slider 40 into a second biasing direction D2 opposite to the first biasing direction D1. As becomes apparent from the drawings, the first and the second biasing element 48a, 48b clamp the leveling slider 40 there between so as to hold the leveling slider 40 in its leveling slider attachment position P in the powder application device 16.

Each biasing element 48a, 48b comprises a spring element 50a, 50b which is adapted to apply a spring force to an abutting element 52a, 52b. Each spring element 50a, 50b is accommodated in a recess 54a, 54b and has a first end bearing against a base wall of said recess 54a, 54b and a second end bearing against the abutting element 52a, 52b. Each abutting element 52a, 52b abuts against the leveling slider 40 so as to bias the leveling slider 40 into its attachment position P in the powder application device 16 and, in the region of an abutting surface 56a, 56b which contacts the leveling slider 40 is provided with a recess 58a, 58b which interacts with a corresponding protrusion or bulge 60a, 60b provided on the leveling slider 40.

The leveling slider exchange arrangement 12 further comprises a storage chamber 62 which is adapted to store at least one exchange leveling slider 40'. The exchange leveling slider 40' serves to replace the leveling slider 40, for example in case the leveling slider 40 no longer is capable of producing a smooth raw material powder layer surface and thus has to be exchanged. In the arrangement depicted in the drawings, the storage chamber 62 accommodates only one exchange leveling slider 40'. It is, however, also conceivable that the storage chamber 62 is sized and dimensioned so as to be adapted to accommodate a plurality of exchange leveling sliders 40'. The storage chamber 62 is connected to a connecting channel 64 which is adapted to connect the storage chamber 62 to the leveling slider attachment position P in the powder application device 16. Thus, the connecting channel 64 allows an exchange leveling slider 40' to be moved from the storage chamber 62 to the leveling slider attachment position P in the powder application device 16.

In the embodiment of a leveling slider exchange arrangement 12 depicted in FIG. 2, the storage chamber 62 is arranged in the powder application device 16 and the connecting channel 64 extends through the powder application device 16 from the storage chamber 62 to the leveling slider attachment position P in a vertical direction, when the powder application device 16 is arranged in its operating position relative to the carrier 18. In the arrangement 12 of FIG. 2, the connecting channel 64 thus connects the storage chamber 62 which is arranged in an upper region of the powder application device 16 at a distance from the carrier 18 to the leveling slider attachment position P which is arranged in a lower region of the powder application device 16 close to the carrier 18. The recesses 54a, 54b which accommodate the spring elements 50a, 50b of the biasing elements 48a, 48b are provided in a portion of a sidewall of the connecting channel 64 which is arranged adjacent to the leveling slider attachment position P.

To the contrary, in the embodiment of a leveling slider exchange arrangement 12 according to FIG. 3, the storage chamber 62 is arranged in a first part 66 of the housing 22 of the apparatus 10 and the connecting channel 64 extends through the first housing part 66 of the apparatus 10 in a vertical direction from the storage chamber 62 to an opening 68 provided in a surface of the first housing part 66. Although not shown in the drawings, it is also conceivable to provide the leveling slider exchange arrangement 10 with a first storage chamber that is arranged in the powder application device 16 and a second storage chamber that is arranged in a first housing part 66 of the apparatus 10.

The leveling slider exchange arrangement 10 further comprises a leveling slider exchange mechanism 70 which is adapted to withdraw the exchange leveling slider 40' from the storage chamber 62, to move the exchange leveling slider 40' to the leveling slider attachment position P in the powder application device 16 via the connecting channel 64 and to bring the exchange leveling slider 40' into engagement with the attachment mechanism 46. In the embodiment according to FIG. 2, the leveling slider exchange mechanism 12 is adapted to apply a pushing force to the exchange leveling slider 40' in order to withdraw the exchange leveling slider 40' from the storage chamber 62, to move the exchange leveling slider 40' to the leveling slider attachment position P in the powder application device 16 via the connecting channel 64 and to bring the exchange leveling slider 40' into engagement with the attachment mechanism 46. In particular, the leveling slider exchange mechanism 12 comprises a pushing rod 72 which is adapted to be manually operated by a user so as to push the exchange leveling slider 40' from the storage chamber 62 along the connecting channel 64 into engagement with the attachment mechanism 46 so as to fix the exchange leveling slider 40' in the leveling slider attachment position P in the powder application device 16.

The pushing force applied to the exchange leveling slider 40' by a user via the pushing rod 72 is sufficient to disengage the leveling slider 40 to be exchanged from the attachment mechanism 46 upon bringing the exchange leveling slider 40' into engagement with the attachment mechanism 46. In particular, when the exchange leveling slider 40' is pushed along the connecting channel 46 and finally contacts the leveling slider 40 which is still held between the abutting elements 52a, 52b, the leveling slider 40 is pushed downwards in the direction of the carrier 18. Finally, the protrusions or bulges 60a, 60b formed on the leveling slider 40 are brought out of engagement from the recesses 58a, 58b provided on the abutting surfaces 56a, 56b of the abutting elements 52a, 52b and the leveling slider 40 is released from its attachment position P in the powder application device 16.

After being released from its attachment position P in the powder application device 16, the leveling slider 14 is received in a receiving chamber 74 as shown in dotted lines in FIG. 2. The receiving chamber 74 is arranged in a second part 76 of the housing 22 of the apparatus 10. In particular, the receiving chamber 74 is defined by a recess provided in a surface of the second housing part 76. The provision of a receiving chamber 74 simplifies the exchange of the used leveling slider 40, since the powder application device 16 can simply be positioned relative to the second housing part 76 in such a manner that the leveling slider attachment position P is placed above the receiving chamber 74 and the used leveling slider 40 is received in the receiving chamber 74 when it is released from its attachment position P in the powder application device 16, when the exchange leveling slider 40' is brought into engagement with the attachment mechanism 46.

In the embodiment of a leveling slider exchange arrangement 12 depicted in FIG. 3, a release mechanism 78 is provided which is adapted to release the leveling slider 40 to be exchanged from its attachment position P in the powder application device 16 before bringing the exchange leveling slider 40' into engagement with the attachment mechanism 46. The release mechanism 78 is arranged adjacent to the receiving chamber 74 and designed in the form of a pump which is adapted to apply a suction force to the leveling slider 40 for disengaging the leveling slider 40 from the attachment mechanism 46. Thereafter, a further pushing rod 80, see FIG. 4, is operated, either manually or automatically, so as to push the leveling slider 40 sucked into the receiving chamber 74 into a storage position. As a result, a further leveling slider may be sucked into the receiving chamber 74 and emptying of the receiving chamber 74 is only required after several leveling slider exchanges.

Thus, in the leveling slider exchange arrangement 12 according to FIG. 3, for exchanging the leveling slider 40, the powder application device 16 first is positioned relative to the second housing part 76 in such a manner that the leveling slider attachment position P is placed above the receiving chamber 74. Thereafter, the release mechanism 78 is operated so that the leveling slider 40 is sucked from its attachment position P in the powder application device 16 into the receiving chamber 74.

Thereafter, the powder application device 16 is positioned relative to the first housing part 66 in such a manner that the leveling slider attachment position P is arranged above the opening 68 and hence above the connecting channel 64 extending through the first housing part 66 to the storage chamber 62. Then, the exchange leveling slider 40' is withdrawn from the storage chamber 62, moved along the connecting channel 64 and finally brought into engagement with the attachment mechanism 46 by the application of a pushing force via an automatically operated pushing rod 72.

Although the present invention is described herein with reference to specific embodiments, features of the above-described specific embodiments can be exchanged as desired. For example, the leveling slider exchange arrangement 12 according to FIG. 2 also can be provided with a release mechanism 78 and a further pushing rod 80 as described with reference to FIGS. 3 and 4. Furthermore, the leveling slider exchange arrangement 12, instead of or additionally to a pushing rod 72, also may comprise a device for applying a suction force to the exchange leveling slider 40', in order to withdraw the exchange leveling slider 40' from the storage chamber 62, to move the exchange leveling slider 40' along the connecting channel 64 and to bring the exchange leveling slider 40' into engagement with the attachment mechanism 46. Furthermore, the leveling slider exchange arrangement 12 may be automatically operable.

The invention claimed is:

1. A leveling slider exchange arrangement for use in an apparatus for manufacturing three-dimensional work pieces by irradiating powder layers with electromagnetic radiation or particle radiation, the leveling slider exchange arrangement comprising:
   a powder application device adapted to apply a raw material powder onto a carrier,
   a leveling slider adapted to level the raw material powder applied onto the carrier by the powder application device,
   an attachment mechanism adapted to releasably attach the leveling slider in a leveling slider attachment position in the powder application device, a storage chamber adapted to store at least one exchange leveling slider, the storage chamber being connected to a connecting channel adapted to connect the storage chamber to the leveling slider attachment position in the powder application device, and a leveling slider exchange mechanism adapted to withdraw the exchange leveling slider from the storage chamber, to move the exchange leveling slider to the leveling slider attachment position in the powder application device via the connecting channel, and to bring the exchange leveling slider into engagement with the attachment mechanism.

2. The leveling slider exchange arrangement according to claim 1, wherein the leveling slider exchange mechanism is adapted to apply at least one of a suction force and/or a pushing force to the exchange leveling slider in order to withdraw the exchange leveling slider from the storage chamber, to move the exchange leveling slider to the leveling slider attachment position in the powder application device via the connecting channel, and to bring the exchange leveling slider into engagement with the attachment mechanism, the at least one of the suction force and the pushing force applied to the exchange leveling slider being sufficient to disengage the leveling slider from the attachment mechanism upon bringing the exchange leveling slider into engagement with the attachment mechanism.

3. The leveling slider exchange arrangement according to claim 1, wherein the leveling slider exchange mechanism comprises a release mechanism adapted to release the leveling slider from its attachment position in the powder application device before bringing the exchange leveling slider into engagement with the attachment mechanism, the release mechanism being adapted to apply at least one of a suction force and a pushing force to the leveling slider.

4. The leveling slider exchange arrangement according to claim 1, wherein the storage chamber is arranged in the powder application device and the connecting channel extends through the powder application device from the storage chamber to the leveling slider attachment position, and/or wherein the storage chamber is arranged in a first housing part of the apparatus and the powder application device is positionable relative to the first housing part of the apparatus in such a manner that the connecting channel which extends through the first housing part of the apparatus connects the storage chamber to the leveling slider attachment position in the powder application device.

5. The leveling slider exchange arrangement according to claim 1, wherein the leveling slider exchange mechanism comprises a receiving chamber adapted to receive the leveling slider when the leveling slider is released from its attachment position in the powder application device, the receiving chamber being configured to accommodate more than one leveling slider, and/or being arranged in a second housing part of the apparatus, and the powder application device being positionable relative to the second housing part of the apparatus in such a manner that the leveling slider is received in the receiving chamber upon being released from its attachment position in the powder application device.

6. The leveling slider exchange arrangement according to claim 1, wherein the attachment mechanism comprises at least one biasing element adapted to bias the leveling slider into its attachment position in the powder application device, the at least one biasing element comprising a spring element adapted to apply a spring force to an abutting element, the abutting element being adapted to abut against the leveling slider so as to bias the leveling slider into its attachment position in the powder application device.

7. The leveling slider exchange arrangement according to claim 6, wherein the abutting element, in the region of an abutting surface which contacts the leveling slider when the biasing element biases the leveling slider into its attachment position in the powder application device, is provided with a recess adapted to interact with a corresponding protrusion provided on the leveling slider.

8. The leveling slider exchange arrangement according to claim 1, wherein the attachment mechanism comprises a first biasing element adapted to bias the leveling slider into a first biasing direction and a second biasing element adapted to bias the leveling slider into a second biasing direction opposite to the first biasing direction, the first and the second biasing element being adapted to clamp the leveling slider therebetween.

9. A method of operating a leveling slider exchange arrangement for use in an apparatus for manufacturing three-dimensional work pieces by irradiating powder layers with electromagnetic radiation or particle radiation, the method comprising:

providing a powder application device adapted to apply a raw material powder onto a carrier, providing a leveling slider adapted to level the raw material powder applied onto the carrier by the powder application device, attaching the leveling slider in a leveling slider attachment position in the powder application device by an attachment mechanism, storing at least one exchange leveling slider in a storage chamber, the storage chamber being connected to a connecting channel adapted to connect the storage chamber to the leveling slider attachment position in the powder application device, and withdrawing the exchange leveling slider from the storage chamber, moving the exchange leveling slider to the leveling slider attachment position in the powder application device via the connecting channel, and bringing the exchange leveling slider into engagement with the attachment mechanism by a leveling slider exchange mechanism.

10. The method according to claim 9, wherein the leveling slider exchange mechanism applies at least one of a suction force and a pushing force to the exchange leveling slider in order to withdraw the exchange leveling slider from the storage chamber, to move the exchange leveling slider to the leveling slider attachment position in the powder application device via the connecting channel, and to bring the exchange leveling slider into engagement with the attachment mechanism, the at least one of the suction force and the pushing force applied to the exchange leveling slider being sufficient to disengage the leveling slider from the attachment mechanism upon bringing the exchange leveling slider into engagement with the attachment mechanism.

11. The method according to claim 9, wherein the leveling slider is released from its attachment position in the powder application device before bringing the exchange leveling slider into engagement with the attachment mechanism by a release mechanism, the release mechanism applying at least one of a suction force and a pushing force to the leveling slider.

12. The method according to claim 9, wherein the storage chamber is arranged in the powder application device and the connecting channel extends through the powder application device from the storage chamber to the leveling slider attachment position, and/or wherein the storage chamber is arranged in a first housing part of the apparatus and the powder application device is positioned relative to the first housing part of the apparatus in such a manner that the connecting channel which extends through the first housing part of the apparatus connects the storage chamber to the leveling slider attachment position in the powder application device.

13. The method according to claim 9, wherein the leveling slider is received in a receiving chamber when the leveling slider is released from its attachment position in the powder application device, the receiving chamber being arranged in a second housing part of the apparatus and the powder application device being positioned relative to the second housing part of the apparatus in such a manner that the leveling slider is received in the receiving chamber upon being released from its attachment position in the powder application device.

14. The method according to claim 9, wherein the leveling slider is biased into its attachment position by at least one biasing element, the at least one biasing element comprising a spring element applying a spring force to an abutting element, the abutting element abutting against the leveling slider so as to bias the leveling slider into its attachment position in the powder application device.

15. An apparatus for manufacturing three-dimensional work pieces by irradiating powder layers with electromagnetic radiation or particle radiation, the apparatus comprising a leveling slider exchange arrangement according to claim 1.

* * * * *